United States Patent

Dyment et al.

[15] 3,654,497

[45] Apr. 4, 1972

[54] SEMICONDUCTOR LASERS UTILIZING INTERNAL SATURABLE ABSORBERS

[72] Inventors: John C. Dyment; Thomas L. Paoli, both of Chatham; Jose' E. Ripper, North Plainfield, all of N.J.

[73] Assignee: Bell Telephone Laboratories, Incorporated, Murray Hill, Berkeley Heights, N.J.

[22] Filed: Dec. 1, 1969

[21] Appl. No.: 881,185

[52] U.S. Cl. ..............................307/312, 307/218, 307/272, 307/238, 331/94.5, 340/173 SS

[51] Int. Cl. .................H01s 3/18, H03k 19/08, H03k 19/02, H03k 19/30

[58] Field of Search ..................................331/94.5; 307/312

[56] References Cited

OTHER PUBLICATIONS

Nelson et al., " Applied Physics Letters," July 69, pp. 7–9

*Primary Examiner*—Roy Lake
*Assistant Examiner*—Darwin R. Hostetter
*Attorney*—R. J. Guenther and Arthur J. Torsiglieri

[57] ABSTRACT

Trapping centers are controllably introduced into a junction laser by diffusing a $P^+$region to within at least 1.5$\mu$ of the junction. The centers, which act as saturable absorbers, produce bistable regions of operation in c.w. junction lasers operating above the delay transition temperature, the laser being either on or off depending on its previous history of operation. Optical logic and memory devices, as well as methods for fabrication, are discussed.

13 Claims, 8 Drawing Figures

INVENTORS J. C. DYMENT
T. L. PAOLI
J. E. RIPPER
BY
A. J. Torsiglieri
ATTORNEY

SEMICONDUCTOR LASERS UTILIZING INTERNAL SATURABLE ABSORBERS

BACKGROUND OF THE INVENTION

This invention relates to a method for controllably introducing saturable absorption trapping centers into junction lasers and to bistable, memory and other optical devices utilizing such centers.

Bistable lasers have obvious application in optical communications systems in general as logic or memory devices. There are at present, however, few bistable injection lasers known in the prior art. One of the few is termed the "double diode," a single conventional, uniformly doped P-N junction diode provided with a pair of separate contacts on the P-side and a single contact on the N-side. The device, as described in U.S. Pat. No. 3,427,563 issued on Feb. 11, 1969 to G. J. Lasher, operates on a pulsed basis and is driven by a pair of separate sources connected to the separate contacts to produce $I_1$ and $I_2$ through adjacent regions 1 and 2 of the diode. $I_1$ is maintained below a first threshold and hence region 1 of the diode is absorptive (i.e., no population inversion is established) and represents loss to the laser radiation. $I_2$ is increased above a second threshold (which includes the loss from region 1) causing the loss in region 1 to saturate and effectively reducing the total loss. Now, the device continues to lase even though $I_2$ is reduced below the second threshold.

The double diode is disadvantageous for at least two reasons, however. First, the need for separate sources and separate contacts on the P-side increases the complexity of the fabrication process with its attendant higher cost. Secondly, the device has been operated on a pulsed basis only. In order to operate continuously (C.W.) a heat sink would have to be provided, generally, on the P-side in order to take advantage of the proximity of the junction. This would necessitate moving the pair of separate contacts to the N-side and would probably be detrimental to bistability, due to current spreading in the thicker N-region.

The fabrication of the double diode is described in the aforementioned patent, and more specifically in an article by G. J. Lasher and others in *Journal of Applied Physics*, 35, 473(1965). The procedure followed involved conventional diffusion techniques to form $P^+$ and P regions in which the junction depth was 25$\mu$ and the $P^+$—P interface depth was 22$\mu$ (see *Journal of Applied Physics*, supra at 474). The $P^+$ and P regions were formed, however, in a single diffusion, and, as indicated above, the separation between the junction and the P—$P^+$ interface was 3.0$\mu$.

In other lasers fabricated by us, but not in accordance with the present invention, the $P^+$ layer was typically 0.1$\mu$–0.3$\mu$ deep and the junction depth was much more than 2.0$\mu$, thus making the separation between the junction and the P—$P^+$ interface much more than 1.5$\mu$. The thin $P^+$ layer was used primarily for making good ohmic contact to the diode. As will be described hereinafter, such structures do not introduce a sufficient number of trapping centers to produce saturable absorption.

It is, therefore, a broad object of the present invention to controllably introduce saturable absorption trapping centers into a junction laser.

It is also an object of the present invention to produce bistable operation in a semiconductor injection laser.

It is another object of the invention to produce such stability in a laser operating on a C.W. basis.

It is still another object of the invention to produce such bistability by means of saturable absorption.

It is yet another object of the invention to produce such bistability without the need for separate contacts and separate sources to control the saturable absorption.

SUMMARY OF THE INVENTION

These and other objects are accomplished in accordance with an illustrative embodiment of the invention in which trapping centers are introduced near the junction region of a C.W. semiconductor injection laser operating above its delay transition temperature. The centers act as saturable absorbers and produce bistable regions of laser operation in which the laser is either on or off depending on its previous history of operation. The trapping centers are introduced by diffusing a $P^+$ region into the P-side of the laser diode to a depth such that the separation between the junction and the P—$P^+$ interface is less than 1.5$\mu$. Moreover, in the structure of the present invention, the junction is shallow (e.g., the $P^+$ layer is 1.0$\mu$ deep with the junction depth being about 1.8$\mu$). This structure is essential for the trapping centers to be saturated by the optical field in the junction region, as will be described more fully hereinafter.

Before discussing the invention in detail, a brief description of the double acceptor trap theory of saturable absorption in trapping centers is in order. As described in "Time Delays and Q-switching in Junction Lasers-I-Theory," J. E. Ripper, *IEEE, Journal of Quantum Electronics*, *QE*-5, 391, (Aug., 1969), this theory is based on a trapping center that exists in three states depending on the number of electrons it contains. When in its nonabsorbing first state, the trapping center (or trap) can capture one electron whose energy is near the energy of the valence band edge and thus enter its optically absorbing second state. In the second state, it can capture another electron whose energy is near the energy of the conduction band edge and thus enter its nonabsorbing third state. The second electron can be captured in two ways, either directly from the conduction band or from the valence band with the absorption of a photon accounting for the energy difference. The latter mechanism produces optical loss which not only accounts for time delays observed in pulsed junction lasers, but also, when saturated by the optical field internal to the laser, produces the bistability herein described when the laser is operated C.W. and above its transition temperature. It is therefore important to note that if the junction temperature were less than the transition temperature, the traps would be transparent to optical radiation and would neither act as saturable absorbers nor produce bistability. Consequently, it is desirable to reduce the transition temperature, as by means of the deep $P^+$ region aforementioned, in order to insure that the junction temperature (for C.W. operation) can be maintained above the transition temperature.

The transition temperature in junction diode lasers is defined in an article in *IEEE, Journal of Quantum Electronics*, *QE*-4, 155 (1968) by J. C. Dyment and J. E. Ripper. As described therein, when a current pulse is applied to a conventional laser, either normal lasing or spontaneous emission is observed. In normal lasing, stimulated emission occurs after a delay time $t$ which can vary from a few nanoseconds to a few hundred nanoseconds, depending on the temperature, and usually continues for the remaining duration of the pump pulse. In most diode lasers, there is a temperature $T_t$, termed the transition temperature, below which $t$ is very short ($\approx 10^{-9}$sec.) and above which $t$ is relatively long ($\approx 10^{-7}$sec.).

BRIEF DESCRIPTION OF THE DRAWING

The objects of the invention, together with its various features and advantages, can be more easily understood from the following more detailed description taken in conjunction with the accompanying drawings, in which.

DETAILED DESCRIPTION

Structure

Figure 1:
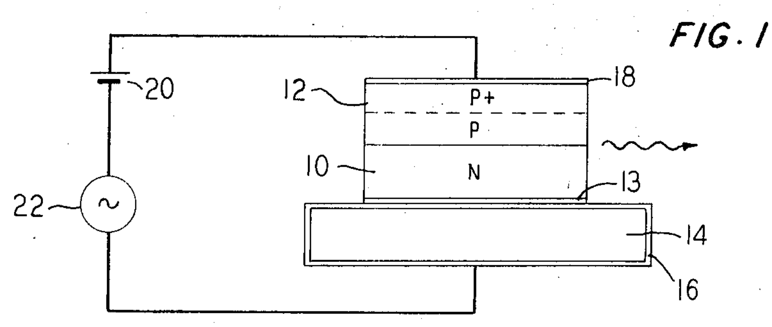
FIG. 1 is a schematic of a bistable P-N junction laser in accordance with an illustrative embodiment of the invention.

An illustrative embodiment of a bistable laser in accordance with the present invention is shown in FIG. 1 as comprising a P-N junction diode 10 in which a deep $P^+$ region 12 is formed in the P-side. The N-side is provided with a metallic contact 13 and is bonded to a metallized heat sink 14 (illustratively a diamond heat sink coated with a metallic layer 16). On the $P^+$ layer 12 is deposited another metallic contact 18, preferably a stripe contact for mode control as described in U. S. Pat. No. 3,363,195 of R. A. Furnanage and D. K. Wilson. Across the contacts are connected a bias source 20 (e.g., a battery) in series with an AC switching source 22. The entire diode structure is typically surrounded by cooling apparatus (not shown) in order to control the temperature of the device.

Fabrication

The diode 10 may be fabricated by making two successive Zn diffusions in an N-type GaAs substrate having a concentration of about $3 \times 10^{18}$ electrons/$cm^3$. These diffusions produce the P and $P^+$ layers shown in FIG. 1. First, the P-layer is formed by using a diffusion source comprising a 2 percent solution of Zn in gallium saturated with undoped GaAs which creates a surface concentration of Zn acceptors of about $10^{19}/cm^3$800° C for 3 hours, produces a 1.8$\mu$ layer and forms the lasing P-N junction. The more heavily doped $P^+$ layer is formed by diffusing from a pure ZnAs source for 65 minutes at 650° C. which creates a surface concentration of Zn acceptors greater than $10^{20}/cm^{3+}$ layer is about 1.0$\mu$. Both diffusions are conveniently accomplished by the "box" method as described by L. A. D'Asaro in *Solid State Electronics*, 1, 3 (1960). After these diffusions, the fabrication proceeds in a standard manner to produce stripe geometry metallic contacts.

The diode so constructed with a $P^+$ layer of about 1.0$\mu$ thickness exhibited a transition temperature $T_t$ of about 150° K. and bistability from $T_t$ to well above room temperature. By way of contrast, a conventional diode (in which the second diffusion was for 15 minutes at 650° C., the $P^+$ layer thickness was 0.1$\mu$–0.3$\mu$, and the transition temperature was about 300° K.) exhibited only normal lasing, not bistability. It has therefore been determined that it is preferable to utilize a shallow junction (e.g., 2.0$\mu$ deep) in combination with a deep $P^+$ layer (i.e., less than 1.5$\mu$ from the junction).

The deep $P^+$ layer is effective in lowering $T_t$ not only because it tends to confine injected electrons, but also because it increases the number of trapping centers in the vicinity of the junction. It is these centers near the junction which are saturated by the internal optical field to produce bistable operation.

While the primary parameter which decreases $T_t$ is a small separation of the $P^+$ layer from the junction, other factors also reduce $T_t$, e.g., lighter doping of the substrate, a special heat treatment, or a longer time for the first diffusion when using a weaker source to achieve the same junction depth. All of these latter techniques are described in the aforementioned article by J. C. Dyment and J. E. Ripper in *IEEE, Journal of Quantum Electronics*, *QE*-4, 155 (1968).

Evidence that the increase in saturable absorption trapping centers and the decrease in $T_t$ was caused by fabricating the $P^+$- layer in accordance with our invention is given by the following example. A single N-type substrate was diffused to form the junction at 2.1$\mu$. After this initial diffusion the substrate was cut into four diodes D1 to D4 which were processed as follows:

D1: Normal processing for 15 minutes at 650° C. to form a conventional, thin $P^+$ layer about 0.1$\mu$ deep.

D2: Processing as for D1 but for 90 minutes at 650° C. to form a $P^+$ layer about 1.0$\mu$ deep in accordance with the invention.

D3: Heat treating for 90 minutes at 650° C. (as described in the J. C. Dyment et al article, supra) without the diffusion source (Zn) and processing as for D1 to produce a thin $P^+$ layer about 0.1$\mu$ deep.

D4: Processing as for D3 but extending the heat treatment for 180 minutes.

The lasers made from diodes D1, D3 and D4 all had very high transition temperatures of about 320° K. and exhibited small saturable absorption. On the other hand, lasers made from diode D2 in accordance with our invention had $T_t \approx$230° K. with a large saturable absorption and a Q-switching region extending in some cases as high as 370° K. Thus we conclude that neither the shallow $P^+$ layer, nor such a layer combined with the heat treatment, will lower $T_t$ or produce saturable absorption. However, when the separation of the P—$P^+$ interface and the junction is less than 1.5$\mu$, $T_t$ is lowered and saturable absorption results.

OPERATION

For the purpose of analysis, the laser gain G is assumed to be proportional to the injection current I: $G(I) = \beta I$, (1)
where $\beta$ is a constant. The internal losses $L(T,I)$ are given by the sum of two components the normal laser loss which is exponential with junction temperature T, and the loss caused by the $n_2$ traps in the absorbing second state:

$$L(T, I) = L_o \exp\left(\frac{T}{T_o}\right) + \epsilon n_2 \qquad (2)$$

where $L_o$, $T_o$ and $\epsilon$ are constants. For convenience, we define an equivalent loss current $I_l$ by: $\beta I_l = L(T,I)$. (3)

For C.W. operation, utilizing the well-known relationship between the junction temperature T and the heat sink temperature $T_{HS}$, as well as the equations disclosed in the aforementioned article by J. E. Ripper in *IEEE, Journal of Quantum Electronics*, *QE*-5,391 (1969), it can readily be shown that the functional relationship between $I_l$ and $I$ takes the form of the curve of FIG. 2A. For a constant heat sink temperature, $I_l$ is a continuous function of $I$ with a discontinuity in its first derivative when $I_l = I$.

The condition for bistability is that for some values of I and $T_{HS}$ the laser can be stably on or off, thus requiring the existence of two values of $I_l$, one larger and one smaller than $I$. More specifically, with reference to FIG. 2A, as the injection current is increased along curve 30 from zero, the laser is OFF (spontaneous emission; $I < I_l$) and remains off until point B. Further increases in current cause the laser to switch ON (stimulated emission; point B'; $I > I_l$). As the current is increased beyond point B', curve 32 is followed. On the other hand, if the current is now reduced, the laser remains ON until point A $$(I = I_A \equiv I_{OFF};\ \partial I_l / \partial I = \infty).$$

Further reduction in current causes the laser to switch OFF to point A'. The region between points A and B is unstable.

At high currents, where heating tends to quench lasing, a second bistable region exists between $I_C$ and $I_D$, with the region between points C and D being unstable. Thus, as the current is increased along curve 32, the laser remains ON until point D, where it switches OFF to point D' on curve 34. When reducing the current along curve 34, the laser remains OFF until point C, where it switches ON to point C'.

Figure 2A:
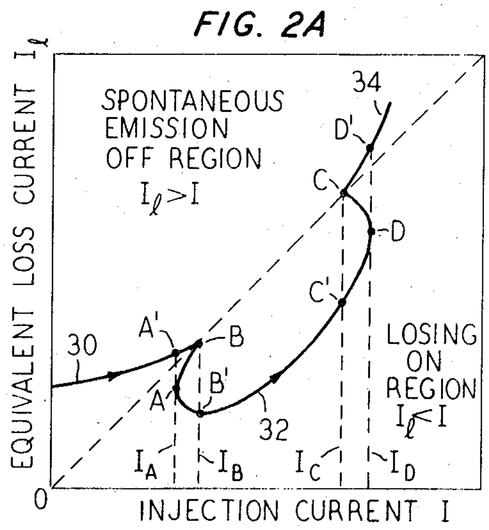
FIG. 2A is a graph of equivalent loss current versus injection current for a bistable laser in accordance with the invention.
Figure 2B:
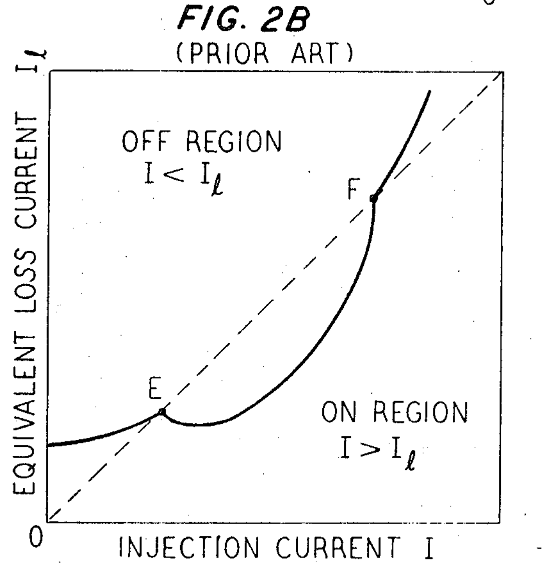
FIG. 2B (PRIOR ART)
FIG. 2B is a graph of equivalent loss current versus injection current for a conventional laser.

Note that in FIG. 2A the points A and D correspond to points where $$\frac{\partial I_l}{\partial I} = \infty \qquad (4)$$

which is an essential condition for bistability. By way of contrast, FIG. 2B shows a graph of $I_l$ versus I for a conventional and monostable laser in which the transition temperature is relatively high, i.e., $P^+$ region is too shallow to produce saturable absorption trapping centers. The function $I_t(I)$ shown is single valued for all values of I, with lasing occurring between points E and F. FIG. 2B is conspicuous for its absence of points satisfying equation (4) and hence a laser exhibiting such a characteristic is not bistable.

Figure 3:
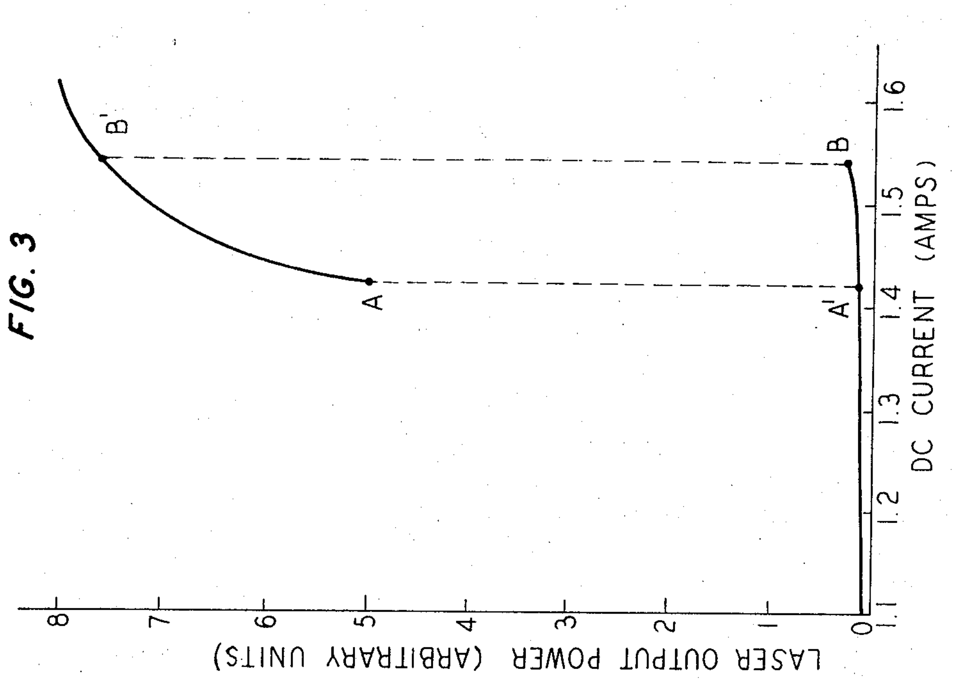
FIG. 3 is a graph of laser output power versus injection current in accordance with the invention.

The output of a laser in the lasing region is proportional approximately to $(I-I_t)$. The behavior described with reference to FIGS. 2A and 2B points to a fundamental difference between bistable and normal lasers: the existence of a discontinuity in the laser output power as the laser turns on or off, instead of the sharp but continuous increase in light output at threshold in normal lasers. The discontinuous behavior of bistable lasers is shown in FIG. 3 where laser output power is plotted against injection current for a constant heat sink temperature. Points A, A', B, and B' again correspond to the points of FIG. 2A.

Figure 4:
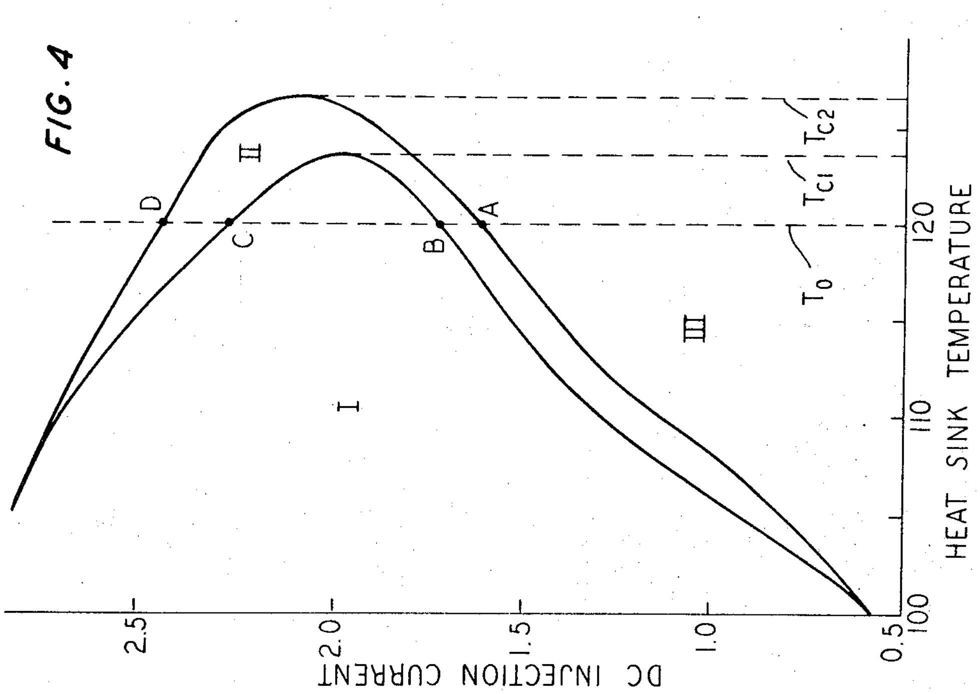
FIG. 4 is a graph of injection current versus heat sink temperature for a bistable laser in accordance with the invention.

The bistable regions of operation are also shown in FIG. 4 where injection current is plotted against heat sink temperature for a stripe geometry laser having a low transition temperature of about 105° K. and mounted on a diamond heat sink. (See "Continuous Operation of GaAs Junction Lasers on Diamond Heat Sinks at 200° K.," J. C. Dyment and L. A. D'Asaro, *App. Phys. Letters*, 11, 292 (1967)). In region I the laser is always ON, and in region III always OFF, regardless of the previous history of laser operation. In region II, the bistable region, the laser is ON or OFF depending on whether it was last in region I or III, respectively.

The bistable operation can be illustrated by following the constant temperature $T_o$ line in FIG. 4. As the current is increased from zero, the laser turns ON at point B and OFF at D. As the current is decreased from above point D, it turns ON at point C and OFF at point A. The points A, B, C, and D correspond to those of FIG. 2A.

In the portion of region II above $T_{cl} = 123°$ K. for this particular diode, the laser cannot be turned ON by varying the current along a constant heat sink temperature line, but only by heating the diode along a constant current line. Above $T_{c2} = 126°$ K., the laser does not operate continuously.

LOGIC DEVICES

Figure 5:
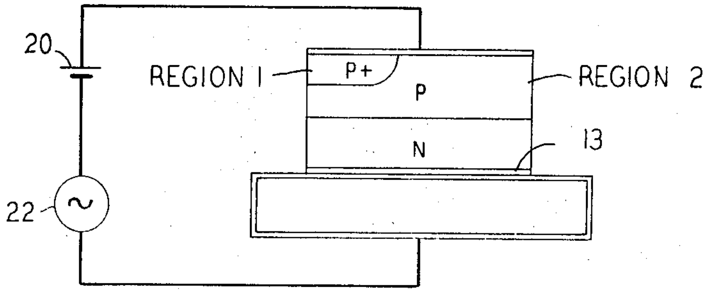
FIG. 5 is a schematic of a second embodiment of the invention.

The laser in accordance with the invention is readily adapted to perform logic functions which do not rely upon bistability, but rather rely upon the changes in threshold caused by saturation of the trapping centers. For this purpose, it is often desirable that the $P^+$ layer, as shown in FIG. 5, be introduced into only a part (region 1) of the P-region. This type of fabrication is readily accomplished using appropriate $SiO_2$ layers (doped with phosphorous, for example) and photolithographic techniques well known in the art. With saturable absorption trapping centers only in region 1, and none in region 2, this device can be electrically switched (by source 22, for example) both on or off by respectively saturating the losses in region 1 or the gain in region 2.

Figure 6A:
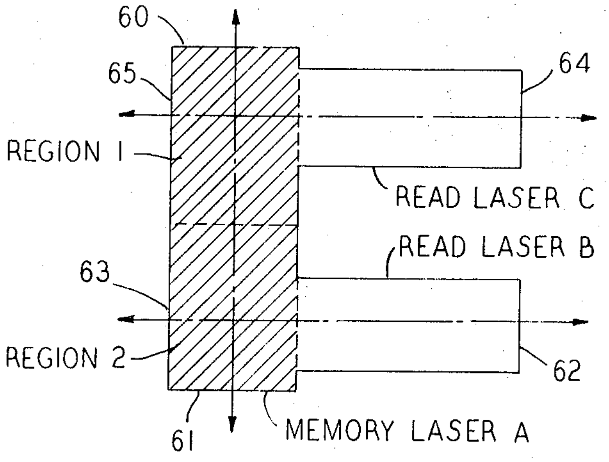
FIG. 6A is a schematic of a third embodiment of the invention for use as a logic device.
Figure 6B:
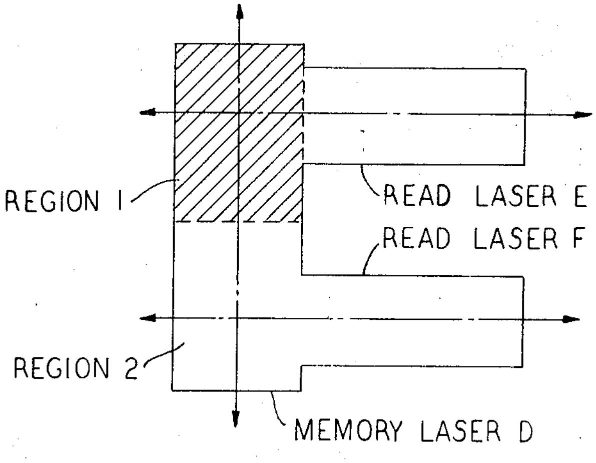
FIG. 6B is a schematic of a fourth embodiment of the invention for use as a logic device.

In the logic devices shown in FIGS. 6A and 6B, trapping centers are introduced, as described above, only in the cross-hatched regions (region 1 of FIG. 6B and regions 1 and 2 of FIG. 6A). These figures are top views of the devices with the rectangular regions being provided with metallic contacts for connecting suitable bias and pump sources (not shown). Thus, each device comprises three independent lasers: a memory laser A or D and a pair of read lasers B and C or E and F disposed so that the optical output of the read lasers is directed to separate regions (1 and 2) of the memory laser. The resonators of lasers A, B, and C are formed by surfaces 60–61, 62–63, 64–65, respectively, which are cleaved or polished to be optically flat.

In the device of FIG. 6A, the current threshold of memory laser A (designated $I_A$, with read lasers B and C OFF) can be lowered by an amount $\Delta I$ when one of the read lasers is turned ON because a part of the trapping centers will be saturated (e.g., those in region 2 common to lasers A and B if read laser B is turned ON) by the external optical field of the read laser radiation. With both read lasers B and C turned ON, the threshold of memory laser A is about $I_A-2\Delta I$. By applying to memory laser A a current pulse of amplitude $I_1$, such that $(I_A-\Delta I) < I_1 < I_A$, it will lase (i.e., turn ON) if either read laser is ON, thus performing a logical OR function $A=B+C$. By applying a current pulse of amplitude $I_2$ such that $(I_A-2\Delta I) < I_2 < (I_A-\Delta I)$ memory laser A will lase only if both read lasers are ON, thus performing a logical AND function $A\ 32\ B \cdot C$.

The device shown in FIG. 6B can be utilized as a nondestructive memory device. Note that the trapping centers (cross-hatched region 1) are located in only a portion of memory laser *D*. When memory laser *D* is ON, the threshold of read laser E is lowered by trap saturation and of laser F increased by gain saturation. By appropriately choosing the amplitude of current pulses applied to read laser *E*, it will lase only when memory laser *D* is ON, thus reading the state of laser $D(E=D)$. Similarly, read laser *F* reads the logical negative of memory laser *D*, lasing only when laser *D* is OFF (i.e., $F=\overline{D}$).

The device of FIG. 6B can also be used to perform other logic functions (e.g., $D=E+\overline{F}; D=E \cdot \overline{F}$) in a manner analogous to that described with reference to the logic device of FIG. 6A. For example, assume trap saturation lowers the threshold $I_{th}$ by $\Delta I_E$ and gain saturation increases it by $\Delta I_F$. The function $D=E+\overline{F}$ is performed if the injection current $I_1$ of laser *D* is such that $(I-\Delta I_E) < I_1$ and $I_1$ is less than the smaller of $I_{th}$ and $(I_{th}-\Delta_E+\Delta I_F)$. Similarly, the function $D=E \cdot \overline{F}$ is performed if the injection current $I_2$ is such that $I_2 < (I_{th}+\Delta I_F)$ and $I_2$ is greater than the larger of $I_{th}$ and $(I_{th}-\Delta I_E+\Delta I_F)$.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, many devices can be devised utilizing pulsed operation as well as C.W. operation, the latter being preferred, however, for the embodiments disclosed herein.

What is claimed is:

1. An optical device comprising:

a continuous wave P-N junction laser having a characteristic delay transition temperature, means for maintaining the temperature of said junction above said delay transition temperature, and means for creating near to said junction optical trapping centers capable of undergoing saturable absorption in response to an optical field near the junction, said creating means comprising a $P^+$ region located on the P-side of said junction and separated therefrom by a distance less than 1.5 microns.

2. The device of claim 1 wherein said laser is a gallium arsenide laser.

3. The device of claim 2 wherein the depth of said junction is about 1,8 microns and the depth of said $P^+$ region is about 1.0 microns.

4. The device of claim 1 in combination with means for switching said device from one stable state to another comprising means for varying the injection current applied to said laser so as to alternately saturate and unsaturate said trapping centers.

5. The device of claim 4 wherein said means for creating optical trapping centers near to the junction of said laser comprises a $P^+$ region located within the P-side of said laser and near to only a portion of said junction, said current varying means being sufficient to cause said $p^+$ region to undergo saturable absorption and the remaining portion of said P-side to undergo gain saturation.

6. The device of claim 1 for use as a unitary optical logic device including said C.W. laser having a longitudinal cavity axis along which radiation is emitted, second and third independent junction lasers disposed transverse to the longitudinal axis of said c.w. laser, said trapping centers being located near to at least a portion of the junction of said C.W. laser, said portion being common to at least one of said independent lasers.

7. The device of claim 6 wherein the external radiation from said one independent laser adjacent to said common portion causes said centers within said portion to saturate, the external radiation of said other independent laser causing gain saturation in said remaining portion of said laser.

8. The device of claim 7 for use as a nondestructive memory wherein the injection current applied to said adjacent laser is adapted so that it lases only if said laser lases and said other independent laser lases only when said C.W. laser does not lase.

9. The device of claim 7 wherein saturation of said centers lowers the current threshold $I_{th}$ of said C.W. laser by an amount $\Delta I_E$ and gain saturation increases by $\Delta I_F$, the injection current I of said C.W. laser being maintained such that $(I_{th} - \Delta I_E) < I$ and I is less than the smaller of $I_{th}$ and $(I_{th} - \Delta I_E + \Delta I_F)$, thus performing the logic function $D = E + \overline{F}$, where *D*, *E* and *F* refer, respectively, to the logic states of said C.W. laser, said one independent laser and said other independent laser.

10. The device of claim 7 wherein saturation of said center lowers the current threshold $I_{th}$ of said C.W. laser by an amount $\Delta I_E$ and gain saturation increases it by $\Delta I_F$, the injection current I of said C.W. laser being maintained such that $I < (I_{th} + \Delta I_F)$ and greater than the larger of $I_{th}$ and $(I_{th} - \Delta I_E + \Delta I_F)$, thus performing the logic function $D = E \cdot \overline{F}$, where *D*, *E* and *F* refer, respectively, to the logic states of said C.W. laser, said one independent laser and said other independent laser.

11. The device of claim 6 wherein said trapping centers are located adjacent to the entire P-N junction of said C.W. laser and wherein the external radiation from one of said independent lasers lowers the current threshold $I_{th}$ of said C.W. laser by an amount $\Delta I$ whereas the external radiation from both of said independent lasers operating simultaneously lowers said threshold by an amount of about $2\Delta I$.

12. The device of claim 11 for use as an optical OR gate comprising means for applying to said C.W. laser injection current of magnitude between $(I_{th} - \Delta I$ and $I_{th}$.

13. The device of claim 11 for use as an optical AND gate comprising means for applying to said C.W. laser an injection current of magnitude between $(I_{th} - 2\Delta I)$ and $(I_{th} - \Delta I)$.

* * * * *

UNITED STATES PATENT OFFICE
CERTIFICATE OF CORRECTION

Patent No. 3,654,497 Dated April 4, 1972

Inventor(s) John C. Dyment, Thomas L. Paoli, and Jose' E. Ripper

It is certified that error appears in the above-identified patent and that said Letters Patent are hereby corrected as shown below:

Column 2, line 54, after "short" change "($\approx 10^{-}$" to --($\approx 10^{-9}$ --;

line 55, change "$^{9}$sec" to --sec--.

Column 3, line 30, delete "$10^{19}/cm^3$ 800°C for 3" and insert --$10^{19}/cm^3$. The diffusion step, when carried out at 800°C for 3--.

Column 3, line 36, delete "$10^{20}/cm^{3+}$ layer" and insert --$10^{20}/cm^3$. Under these conditions the thickness of the $P^+$ layer--.

Column 6, line 10, change "A 32 BC" to --A = BC--.

Column 6, line 30, delete "($I_{th}$ - $\Delta_E$ + $\Delta I_F$)" and insert --($I_{th}$ - $\Delta I_E$ + $\Delta I_F$)--.

Column 8, line 18, insert an end parenthesis after "ΔI".

Column 8, line 21, after "between" delete "($I_{th}$ - $_2\Delta_1$)" and insert --($I_{th}$ - 2ΔI)--.

Signed and sealed this 7th day of November 1972.

(SEAL)
Attest:

EDWARD M.FLETCHER,JR.
Attesting Officer

ROBERT GOTTSCHALK
Commissioner of Patents